United States Patent
Yamamoto

(10) Patent No.: US 9,634,333 B2
(45) Date of Patent: Apr. 25, 2017

(54) CATALYST PRODUCTION METHOD AND CATALYST PRODUCTION APPARATUS, AND METHOD FOR CONTROLLING CHARACTERISTICS OF REACTION LAYER FOR FUEL CELL USING THE CATALYST

(75) Inventor: Taizo Yamamoto, Tokyo (JP)

(73) Assignee: KABUSHIKIKAISHA EQUOS RESEARCH, Tokyo (JP)

( * ) Notice: Subject to any disclaimer, the term of this patent is extended or adjusted under 35 U.S.C. 154(b) by 0 days.

(21) Appl. No.: 13/637,451

(22) PCT Filed: Mar. 30, 2011

(86) PCT No.: PCT/JP2011/057974
§ 371 (c)(1),
(2), (4) Date: Oct. 23, 2012

(87) PCT Pub. No.: WO2011/125715
PCT Pub. Date: Oct. 13, 2011

(65) Prior Publication Data
US 2013/0035228 A1 Feb. 7, 2013

(30) Foreign Application Priority Data

Mar. 31, 2010 (JP) .................................. 2010-084655
Feb. 21, 2011 (JP) .................................. 2011-034608

(51) Int. Cl.
*B01J 27/24* (2006.01)
*B01J 27/02* (2006.01)
(Continued)

(52) U.S. Cl.
CPC ............ *H01M 4/92* (2013.01); *H01M 4/8807* (2013.01); *H01M 4/926* (2013.01);
(Continued)

(58) Field of Classification Search
CPC .... H01M 4/8803; H01M 4/8878; H01M 4/92; H01M 4/926
(Continued)

(56) References Cited

U.S. PATENT DOCUMENTS

2005/0014635 A1* 1/2005 Zhou et al. .................... 502/159
2008/0176739 A1* 7/2008 Uozumi et al. ............... 502/152
(Continued)

FOREIGN PATENT DOCUMENTS

DE        4111657 A1 * 10/1992 ........... C07C 303/22
JP     2001-347152 A    12/2001
(Continued)

OTHER PUBLICATIONS

Yamamoto, Machine translation of JP2006140061, publication date, Jun. 1, 2006.*

*Primary Examiner* — Jun Li
(74) *Attorney, Agent, or Firm* — Bacon & Thomas, PLLC

(57) ABSTRACT

The present invention is directed to improving a catalyst applied to a reaction layer having a structure (PFF structure) in which a polymer electrolyte phase surrounds a periphery of a catalyst with a hydrophilic region interposed therebetween and reducing the amount of catalyst metal particles used.
A method for producing a catalyst for a fuel cell, in which a catalyst metal particle is supported on a carrier, includes the steps of: preparing an unmodified catalyst in which a catalyst metal particles is supported on a carrier; and modifying the catalyst metal particle in the unmodified catalyst with at least one type of modifying group selected from a nitric acid group, an amino group, a sulfonic acid group, a hydroxy group, and halogen groups.

5 Claims, 11 Drawing Sheets

(51) Int. Cl.
    *B01J 19/18*    (2006.01)
    *B01J 27/25*    (2006.01)
    *H01M 4/92*     (2006.01)
    *H01M 4/88*     (2006.01)
    *H01M 4/86*     (2006.01)
    *H01M 8/1018*   (2016.01)

(52) U.S. Cl.
    CPC .. *H01M 4/8663* (2013.01); *H01M 2008/1095* (2013.01); *H01M 2300/0082* (2013.01)

(58) Field of Classification Search
    USPC .......................................... 502/200, 201, 216
    IPC ........................ B01J 19/18, 27/04, 27/24, 27/25
    See application file for complete search history.

(56) References Cited

U.S. PATENT DOCUMENTS

| | | | | |
|---|---|---|---|---|
| 2009/0263605 | A1* | 10/2009 | Hoshi et al. | 428/40.4 |
| 2010/0086832 | A1* | 4/2010 | Lopez et al. | 429/44 |
| 2011/0108262 | A1* | 5/2011 | Yamasaki et al. | 165/185 |
| 2012/0107724 | A1* | 5/2012 | Nagami et al. | 429/492 |

FOREIGN PATENT DOCUMENTS

| | | |
|---|---|---|
| JP | 2002-324557 A | 11/2002 |
| JP | 2004-185900 A | 7/2004 |
| JP | 2006-140061 A | 6/2006 |
| JP | 2006-286330 A | 10/2006 |

* cited by examiner

F I G . 5A
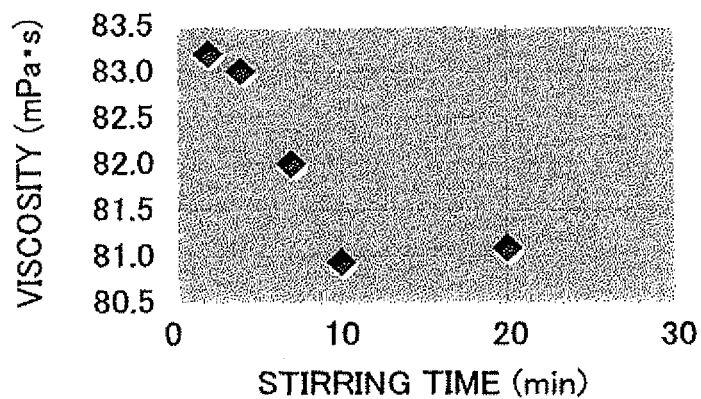
F I G . 5B
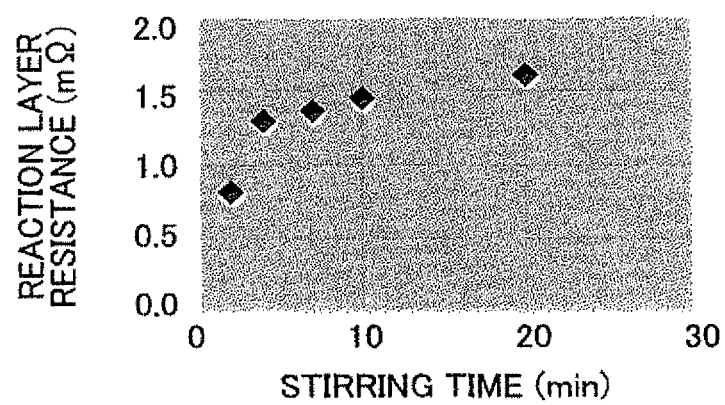

S2p SUPERPOSITION (BACK GROUND HAS BEEN ELIMINATED)

ADSORPTION MECHANISM OF NH$_2$
GROUP TO Pt/C CATALYST SURFACE

US 9,634,333 B2

CATALYST PRODUCTION METHOD AND CATALYST PRODUCTION APPARATUS, AND METHOD FOR CONTROLLING CHARACTERISTICS OF REACTION LAYER FOR FUEL CELL USING THE CATALYST

TECHNICAL FIELD

The present invention relates to a method for producing a catalyst for a fuel cell and an apparatus for producing a catalyst for a fuel cell, and a method for controlling characteristics of a reaction layer for a fuel cell using the catalyst.

BACKGROUND ART

A fuel cell is configured by laminating a reaction layer on a solid electrolyte film and the characteristics of the reaction layer on an air electrode side that is a fuel cell reaction field largely influence performance of the fuel cell.

The inventor of the present invention has disclosed, as such an air electrode side reaction layer, a reaction film having a PFF structure (registered trade mark: the same applies hereinafter) (Patent Document 1). Here, the PFF structure refers to a structure in which a hydrophilic functional group in a side chain of a polymer electrolyte is aligned on a catalyst side to form a hydrophilic region on the catalyst. Here, the catalyst is formed by supporting catalyst metal particles on a carrier containing carbon particles or the like.

See Patent Document 2 and Non-patent Document 1 as a document disclosing a technology related to the present invention.

RELATED-ART DOCUMENTS

Patent Documents

Patent Document 1: Japanese Patent Application Publication No. 2006-140061 (JP 2006-140061 A)
Patent Document 2: Japanese Patent Application Publication No. 7-134995 (JP 7-134995 A)
Non-patent Document 1: "Carbon" p 199 (Kim Kinoshita: John Wiley & Sons (1988))

SUMMARY OF THE INVENTION

Problem to be Solved by the Invention

As the catalyst metal particle, a fine particle of an expensive noble metal such as platinum is adopted. It is an important task to reduce the amount of the catalyst metal particles used for reducing the production cost of the fuel cell and disseminating the fuel cell.

The present invention is directed to improving a catalyst that is applied to the reaction layer having a PFF structure and to reducing the amount of the catalyst metal particles used.

Means for Solving the Problem

As a result of assiduous research intended to overcome these disadvantages, the inventor of the present invention has found that by modifying the surface of catalyst metal particles with a hydrophilic group, a PFF structure is stabilized and the characteristics of a reaction layer are enhanced, and has thought of the present invention.

That is a first aspect of the present invention is defined as follows;

a method for producing a catalyst for a fuel cell, in which a catalyst metal particle is supported on a carrier, the method characterized by including the steps of: preparing an unmodified catalyst in which a catalyst metal particle is supported on a carrier; and modifying the catalyst metal particle in the unmodified catalyst with at least one type of modifying group selected from a nitric acid group, an amino group, a sulfonic acid group, a hydroxy group, and halogen groups.

By the thus defined method for producing the catalyst according to the first aspect, the catalyst metal particle is modified with a predetermined hydrophilic group, so that hydrophilicity around the catalyst metal particles is enhanced. Consequently, a hydrophilic region is reliably formed between the catalyst and a polymer electrolyte phase.

The hydrophilic modifying group is preferably at least one type selected from a nitric acid group, an amino group, and a sulfonic acid group (a second aspect of the present invention). This is because the stability of an the hydrophilic region is enhanced.

It is preferred that the surface of the catalyst metal particle be modified with the modifying group by bonding a complex of the same metal or noble metal or a complex of the same type of metal or noble metal as the catalyst metal particle, the complex containing the modifying group, with the catalyst metal particle (a third aspect of the present invention). This is because the process for modifying is easy and also, the control of the amount of the modifying group becomes easy.

From the viewpoint of the acquisition easiness of the complex, the catalyst metal particle and the complex metal are preferably platinum (a fourth aspect of the present invention).

BRIEF DESCRIPTION OF THE DRAWINGS

FIG. 3 is a schematic view showing a form of an electrolyte in an electrolyte solution, where

FIG. 5A is a graph showing a relationship between the time for stirring a pre-paste and an electrolyte solution and the viscosity of the resultant mixture, and FIG. 5B is a graph showing a relationship between the time for stirring a pre-paste and an electrolyte solution and reaction layer resistance.

MODES FOR CARRYING OUT THE INVENTION

Figure 1:
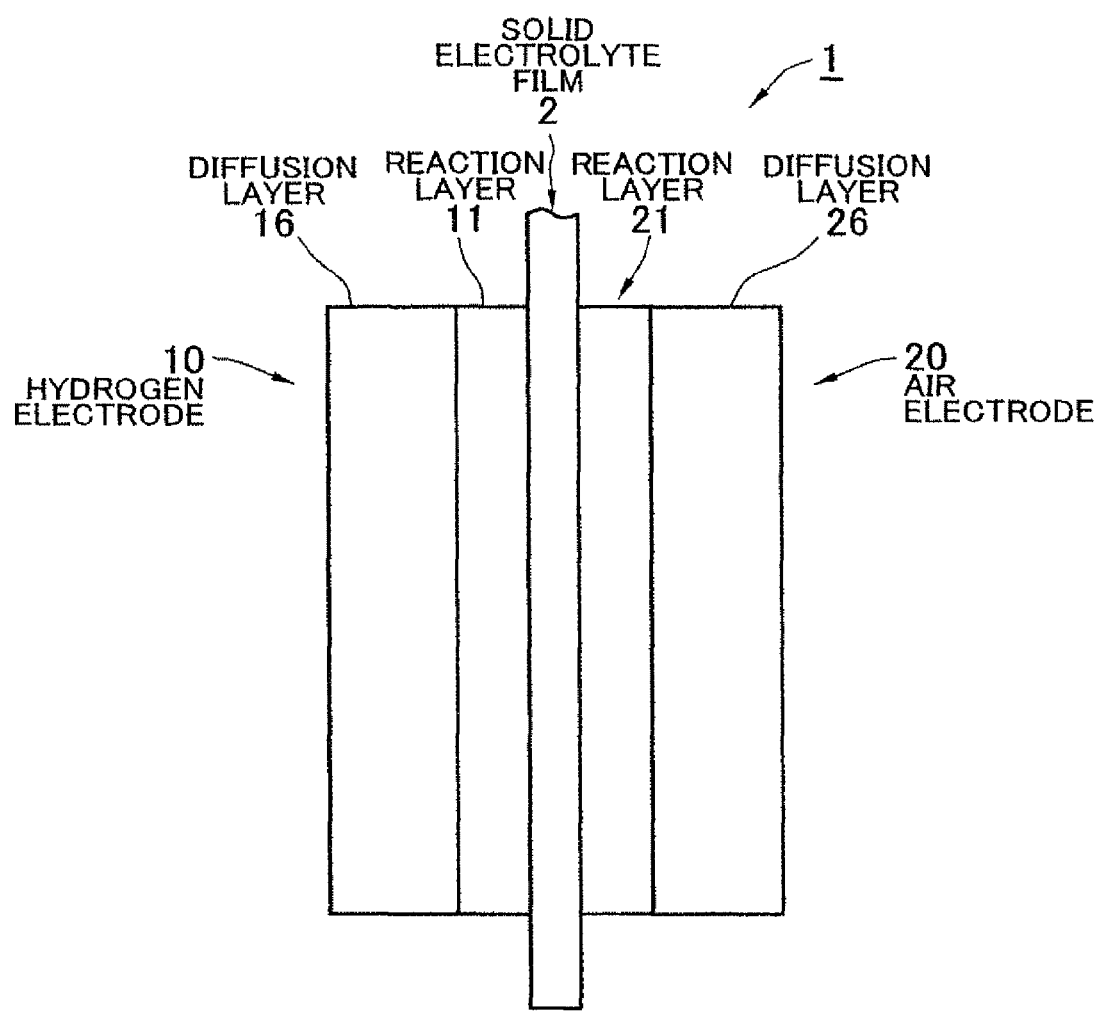
FIG. 1 is a cross-sectional view showing a constitution of the fuel cell according to an embodiment of the present invention.

A fuel cell 1 according to an embodiment of the present invention is shown in FIG. 1.

The fuel cell 1 has a constitution in which a solid electrolyte film 2 is sandwiched between a hydrogen electrode 10 and an air electrode 20.

For the solid electrolyte film 2, a proton conductive polymer material a fluorine-based polymer such as Nafion (registered trade mark of E.I. du Pont de Nemours and Company, the same hereinafter) can be used, for example.

The hydrogen electrode 10 contains a reaction layer 11 and a diffusion layer 16 and these layers are laminated on the solid electrolyte film 2 in this order. The reaction layer 11 is a layer produced by coating, with an electrolyte, a layer (catalyst) in which catalyst metal particles such as platinum are supported on a conductive carrier such as a carbon particle. The diffusion layer 16 is formed from a material having conductivity and gas diffusing property, such as carbon paper, carbon cloth, and carbon felt. As the carrier of the reaction layer 11, tin oxide and titanium oxide may also be used.

Any electrolyte can be selected so long as the electrolyte is a substance that allows the movement of the proton. From the viewpoint of durability and the like, Nafion is preferably used.

By applying a paste of a catalyst and an electrolyte constituting the reaction layer 11 onto the diffusion layer 16 and drying the resultant coating, the reaction layer 11 is laminated on the diffusion layer 16. Such a laminate is laminated on the solid electrolyte film 2.

The air electrode 20 contains a reaction layer 21 and a diffusion layer 26. The basic structure and the production method of the reaction layer 21 and diffusion layer 26 are the same as those for the hydrogen electrode 10.

However, the fuel cell reaction is principally effected in the reaction layer 21 of the air electrode 20, so that the reaction layer 21 influences characteristics of the fuel cell 1, The inventor of the present invention has advocated, as the reaction layer, a PFF structure.

Here, the PFF (registered trade mark of the applicant) structure refers to a structure in which a hydrophilic functional group in a side chain of a polymer electrolyte is aligned on a catalyst side for forming a hydrophilic region on the catalyst.

Figure 2:
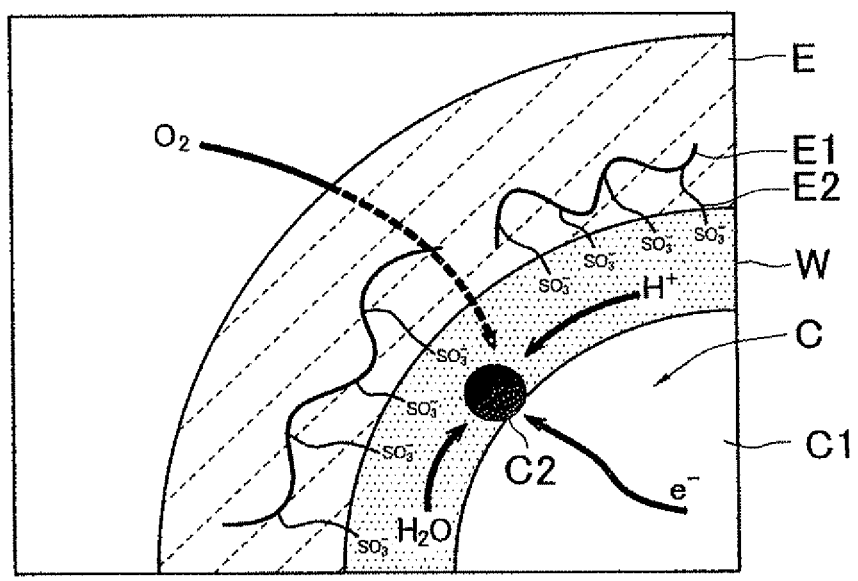
FIG. 2 is a schematic view of a PFF structure.

For example, in perfluorosulfonic acid (Nafion and the like: registered trade mark of E.I. du Pont de Nemours and Company) commonly used as the polymer electrolyte, a sulfon group ($SO_3^-$) as a hydrophilic functional group is bonded to a hydrophobic main chain E1 as a side chain E2. As shown in FIG. 2, by aligning the hydrophilic functional group in a catalyst C side, a continuous hydrophilic region W is formed between the catalyst C and the electrolyte layer E. In an aggregated catalyst C, the hydrophilic regions W on the surfaces of the catalyst particles are communicated with each other. In the hydrophilic region W of the PFF structure, the proton ($H^+$) and water ($H_2O$) can move smoothly and as the result thereof, an electro-chemical reaction of the fuel cell is accelerated.

In the PFF structure, water is assembled around the catalyst C, so that even when the amount of water is small, most of such water contributes efficiently to the electro-chemical reaction. Consequently, even in a low-humidified state, the lowering of the power generating capacity of the fuel cell can be prevented. The continuous hydrophilic region W functions as a draining path of excessive water, so that even in a high-humidified state, a flooding phenomenon can be prevented.

In the above description, the catalyst C refers to a catalyst in which catalyst metal particles C2 are supported on a carrier C1 having conductivity. For the carrier C1, conductivity and air permeability are required. Although a porous carbon black particle can be adopted as the carrier C1, tin oxide, titanic acid compounds, and the like can also be used. Each catalyst metal particle C2 contains metal fine particles capable of providing an active site of the fuel cell reaction, and as the catalyst metal particle C2, a noble metal such as platinum, cobalt, and ruthenium and an alloy of the noble metal can be used.

The method for supporting the catalyst metal particles C2 on the carrier C1 can be accordingly selected from known methods such as an impregnation method, a colloidal method, and a depositing precipitation method depending on the materials of the carrier C1 and the catalyst metal particles C2 and the application of the catalyst.

Usually, the catalyst is provided from a catalyst maker. It is preferred that the catalyst be physically and/or chemically treated according to the characteristics required for the fuel cell.

(Physical Treatment of Catalyst)

As the physical treatment of the catalyst, there are a grinding treatment and a defoaming treatment.

—Grinding Treatment—

Generally, in the catalyst, the carriers of the catalyst are aggregated to form a secondary particle or a tertiary particle. Thus, for enhancing the surface area of the catalyst, it is preferred to grind the aggregate to micronize the catalyst. For micronizing the catalyst, the aggregate of the catalyst is preferably dispersed in a medium to be wet-ground.

By adopting wet-grinding, in comparison with dry-grinding, a higher energy can be applied to the aggregate of the catalyst, so that the aggregate can be more finely ground. In addition, in comparison with dry-grinding, a rebinding of the catalyst can be effectively prevented. As the method for wet-grinding, a homogenizer, a wet jet mill, a ball mill, or a bead mill can be adopted.

By adopting wet-grinding, an effect of removing impurities attached to the carrier of the catalyst can also be obtained. Although water is usually adopted as the medium, other media (organic solvent or the like) may also be adopted depending on the properties of impurities. At first, wet-grinding is performed using water as the medium and then, by using an organic solvent or the like as the medium, impurities can also be removed from the catalyst.

In order to dry the wet-ground catalyst, it is preferred to remove the medium by sublimation. With this, re-aggregation of the catalyst can be prevented. Examples of the method for sublimating the medium include a vacuum drying method. On the contrary, when a heating-drying method is adopted, during the movement or the evaporation of the medium by heating, capillary shrinkage phenomenon is caused and the catalysts are re-bonded with each other, so that a highly dispersed state as obtained by wet-drying cannot be maintained.

By performing wet-grinding and if necessary, removal of impurities relative to the carrier of the catalyst, catalyst metal particles can also be supported on a carrier with the carrier dispersed in a medium (such as water). In this case also, it is preferred, in the drying process, to remove the medium in which the catalyst is dispersed by sublimation.

—Defoaming Treatment—

It is necessary to remove bubbles (defoaming treatment) from the periphery of the catalyst with the catalyst mixed and dispersed in water. This is because, when a hydrophilic region is formed between the catalyst and the electrolyte layer, the bubbles become obstacle.

This defoaming treatment can be performed by using a centrifugal stirring method with a hybrid mixer (rotation/revolution-type centrifugal stirrer).

Needless to say, the method for the defoaming treatment is not limited to the centrifugal stirring method, and other stirring methods (such as a ball mill method, a stirrer method, a bead mill method, and a roll mill method) can also be used.

In addition, there is also a case where bubbles can be removed from the periphery of the catalyst during wet-grinding, and in this case, an independent defoaming treatment is not necessary.

(Chemical Treatment of Catalyst)

The catalyst is chemically treated to modify the surface of the catalyst metal particle with a specified hydrophilic group.

By modifying the surface of the metal catalyst particle with the hydrophilic group, hydrophilicity around the catalyst metal particle is enhanced and hydrophilicity of the hydrophilic region W between the catalyst C and the electrolyte layer E is enhanced.

Here, "modifying" means that the modifying group exists on the surface of the catalyst metal particle, and even through a usual production process, the modifying group is not separated from the catalyst metal particle.

Examples of the hydrophilic group include at least one type selected from a nitric acid group, an amino group, a sulfonic acid group, a hydroxy group, and halogen groups. Further preferred examples of the hydrophilic group include at least one type selected from a nitric acid group, an amino group, and a sulfonic acid group.

Due to the existence of these hydrophilic groups in the periphery of the catalyst metal particle, a hydrophilic region can be easily formed in the periphery of the catalyst metal particle. The catalyst metal particles are homogeneously dispersed on the carrier, so that as the result thereof, the hydrophilic region on the surface of the catalyst is easily formed and after the formation thereof, the hydrophilic region is stabilized.

As the method for modifying the catalyst metal particle with the hydrophilic group, in the present invention, a complex of the same metal (noble metal) as the catalyst metal particle or a complex of the same type of metal (noble metal) as the catalyst metal particle that contains the modifying group is bonded to the catalyst metal particle. By utilization of the complex, the catalyst metal particle can be modified with the hydrophilic group without applying any stress to the structure of the catalyst.

When platinum or a platinum alloy is adopted as the catalyst metal particle, the modification is preferably performed with the platinum complex solutions below. It is considered that as such a platinum complex solution, there can be adopted a chloroplatinic (IV) acid hydrate aqueous solution ($H_2PtCl_6 \cdot nH_2O/H_2O$ sol.), a chloroplatinic (IV) acid hydrochloric acid solution ($H_2PtCl_6/H_2O$ sol.), an ammonium chloroplatinate (IV) aqueous solution (($NH_4)_2PtCl_6/H_2O$ sol.), a dinitrodiammineplatinous (II) aqueous solution (cis-[$Pt(NH_3)_2(NO_2)_2$]/$H_2O$ sol.), a dinitrodiammineplatinous (II) nitric acid solution (cis-[$Pt(NH_3)_2(NO_2)_2$]/$HNO_3$ sol.), a dinitrodiammineplatinous (II) sulfuric acid solution (cis-[$Pt(NH_3)_2(NO_2)_2$]/$H_2SO_4$ sol.), a potassium tetrachloroplatinate (II) aqueous solution ($K_2PtCl_4/H_2O$ sol.), a platinous (II) chloride aqueous solution ($PtCl_2/H_2O$ sol.), a platinic (IV) chloride aqueous solution ($PtCl_4/H_2O$ sol.), a tetraamine platinous (II) dichloride hydrate aqueous solution ([$Pt(NH_3)_4$]$Cl_2 \cdot H_2O/H_2O$ sol.), a tetraamine platinous (II) hydroxide aqueous solution ([$Pt(NH_3)_4$](OH)$_2/H_2O$ sol.), a hexaamine platinic (IV) dichloride aqueous solution ([$Pt(NH_3)_6$]$Cl_2/H_2O$ sol.), a hexaamine platinic (IV) hydroxide aqueous solution ([$Pt(NH_3)_6$](OH)$_2/H_2O$ sol.), a hexahydroxo platinic (IV) acid aqueous solution ($H_2[Pt(OH)_6]/H_2O$ sol.), a hexahydroxo platinic (IV) acid nitric acid solution ($H_2[Pt(OH)_6]/HNO_3$ sol.), a hexahydroxo platinic (IV) acid sulfuric acid solution ($H_2[Pt(OH)_6]/H_2SO_4$ sol.), an ethanolamine platinic solution ($H_2[Pt(OH)_6]/H_2NCH_2CH_2OH$ sol.), or the like.

According to the knowledge of the inventor of the present invention, as the hydrophilic group for modifying the catalyst metal particle containing platinum or a platinum alloy, a nitric acid group is preferably selected. As the nitro platinum complex solution for modifying the catalyst metal particle, there can be adopted a dinitrodiammineplatinum (II) nitric acid solution (cis-[$Pt(NH_3)_2(NO_2)_2$]/$HNO_3$ sol.) and a hexahydroxo platinic (IV) acid nitric acid solution ($H_2Pt(OH)_6/HNO_3$ sol.) that contain $NO_3^-$ as a hydrophilic ion, a hexahydroxo platinic (IV) acid sulfuric acid solution (($H_2Pt(OH)_6)/H_2SO_4$ sol.) containing $SO_4^{2-}$ as a hydrophilic ion, a tetraamine platinous (II) hydroxide aqueous solution ([$Pt(NH_3)_4$](OH)$_2$]/$H_2O$ sin.) containing $NH_4^+$ as a hydrophilic ion, or the like.

The method for modifying the catalyst metal particle with the hydrophilic group can be accordingly selected according to the characteristics of the catalyst metal particle and the hydrophilic group. For example, when the catalyst metal particle is made of platinum or a platinum alloy, the catalyst may be mixed in a platinum complex solution and if necessary, the resultant mixture may be stirred. When the nitric acid group is selected, by charging an unmodified catalyst into a dinitrodiammineplatinum (complex) nitric acid aqueous solution and by stirring the resultant mixture, the platinum complex (dinitrodiammineplatinum) is adsorbed to a catalyst platinum particle as the unmodified catalyst. In addition, a dinitrodiammineplatinum (complex) nitric acid aqueous solution may be added into a dispersion in which the unmodified catalyst is dispersed in water to stir the resultant mixture. Here, the stirring is not limited to a mechanical stirring using a propeller or a stirrer and the stirring may be performed by flowing two solutions into one conduit.

(Order of Physical Treatment and Chemical Treatment for Catalyst)

In order to efficiently modify the catalyst metal particle in the catalyst with the hydrophilic group, the catalyst is preferably subjected to a physical treatment prior to a chemical treatment. This is because, by physically treating the catalyst, more catalyst metal particles can be contacted with a treating liquid containing the hydrophilic group.

When there is a fear that the catalyst is re-aggregated due to a chemical treatment, the catalyst is preferably subjected to a physical treatment again after being subjected to a chemical treatment.

Needless to say, the catalyst may be subjected first to a chemical treatment and then, to a physical treatment.

In order to obtain the PFF structure, the catalyst is necessary to be subjected at least to a defoaming treatment.

(Preparation of Pre-Paste)

In a pre-paste prepared by dispersing the catalyst in water, the water content is controlled.

In order to face the hydrophilic group of the electrolyte to the surface of the catalyst to obtain the hydrophilic region between the electrolyte and the catalyst, the catalyst is mixed with water to form an aqueous layer on the surface of the catalyst beforehand (hydrophilization process of catalyst).

According to the study of the inventor of the present invention, the mixing ratio of the catalyst and water should be accordingly selected according to the type of the catalyst (particularly the type and the particle size of the carrier of the catalyst). However, the water content state of the mixture (pre-paste) of the catalyst and water is preferably a water content state (fluidity limit) in which the mixture (pre-paste) of the catalyst and water is changed from a capillary state (a state in which water exists in the entire periphery of the catalyst particle but the mixture has no fluidity) to in a slurry state (a state in which water exists in the entire periphery of the catalyst particle and the mixture has fluidity), or a water content state near the above water content state (fluidity limit). Such a water content is an optimal water content capable of forming a continuous hydrophilic region between the catalyst and the electrolyte while hydrophilizing the surface of the catalyst.

Here, the fluidity limit refers to a limit of the water content at which the mixture is changed from a capillary state to a slurry state and starts flowing.

In the relationship between the shearing rate and the viscosity of the pre-paste, when the viscosities are plotted relative to the shearing rates in a double-logarithmic graph to obtain an approximation straight line, the fluidity limit is a paste state in which the inclination of the approximation straight line becomes −1 and the slurry state is a paste state in which the inclination of the approximation straight line becomes −0.8.

As the inclination of the approximation straight line in the relationship of the viscosity relative to the shearing rate becomes −1 or more, that is, the inclination becomes gentler, the paste state becomes a slurry state having higher fluidity. A paste containing excessive water causes lowering of the performance of MBA, so that a water adding amount at which the paste becomes the slurry from the fluidity limit, that is, the inclination falls within a range of −1 to −0.8 is the optimal amount. Herewith, an ideal pre-paste can be obtained. For the pre-paste, it is important to define a water adding amount of necessity minimum from the inclination of the approximation straight line. In the capillary state in which the inclination is less than −1 (the inclination becomes steep), the mixture loses fluidity, so that more energy becomes necessary during mixing, and the stirring of water and the catalyst easily becomes unsatisfactory, which is not suitable as a condition under which a preferred pre-paste can be obtained.

Also with a water content more than the above optimal amount, water exists in the periphery of the catalyst, so that the catalyst surface can be hydrophilized. However, such an excessive water content has a fear of becoming an obstacle against the construction of the PFF structure when the pre-paste is mixed with the electrolyte solution (pre-solution). Away from the catalyst, the excessive water content attracts the hydrophilic group of the electrolyte in a region distant from the catalyst. Accordingly, the number of hydrophilic groups of the electrolyte facing the catalyst becomes smaller, and as the result, the region of hydrophilicity to be formed between the catalyst and the electrolyte may become smaller or be divided, or lowering of the hydrophilic function (lowering of retentivity of water) in the region may be caused.

Here, when the catalyst is wet-ground in water, the catalyst is dispersed in a large amount of water. The amount of water is preferably an amount of 5 to 100 times the amount of the catalyst in the weight ratio. Then, water is removed to adjust the water content to a preferred water content as the pre-paste. For the removal of water, a method such as heating in a water bath can be adopted.

(Preparation of Electrolyte Solution)

As the electrolyte, the perfluorosulfonic acid is generally used. This electrolyte is dissolved in a solvent mixture of water and an organic solvent and the resultant solution is mixed with the pre-paste.

The organic solvent is accordingly selected according to the characteristics of the electrolyte. According to the study of the inventor of the present invention, the organic solvent is preferably at least one type of a secondary alcohol or a tertiary alcohol. With a primary alcohol such as methanol and ethanol, even when the water concentration is reduced, the viscosity of the electrolyte solution does not become high. When a secondary alcohol such as isopropyl alcohol (IPA) or a tertiary alcohol such as tert-butyl alcohol (TBA) is used as the organic solvent, the solid of the electrolyte in the electrolyte solution becomes more disentangled state. In addition, according to the study of the inventor of the present invention, when the secondary alcohol and the tertiary alcohol are mixed to be used, the solid content of the electrolyte in the electrolyte solution becomes much more disentangled state.

The inventor of the present invention has studied the optimization of the electrolyte solution used for the PFF structure and as the result thereof, the inventor has perceived that the optimal water content in the electrolyte solution is 10% by weight or less and further preferably 5% by weight or less, based on the weight of the electrolyte solution.

Between the electrolyte and the water content, there is a relationship described below.

The inventor has found that when the water concentration in the electrolyte solution is reduced, the viscosity of the electrolyte solution becomes high even in the case where the concentration of the electrolyte in the electrolyte solution is the same. On the contrary, when the water concentration is increased, the viscosity of the electrolyte solution becomes low. The reason is presumed as follows.

Figure 3A:
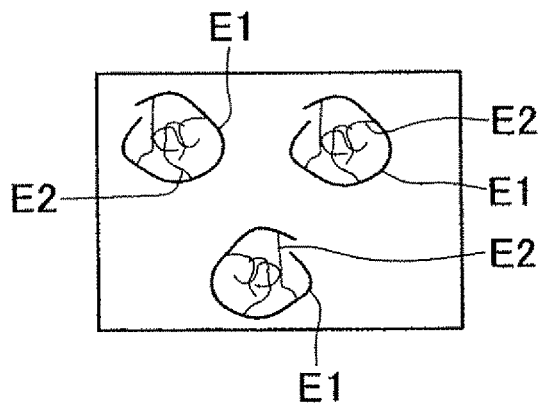
FIG. 3A shows a case where the water content is excessive and FIG. 3B shows a case where the water content is appropriate.
Figure 3B:
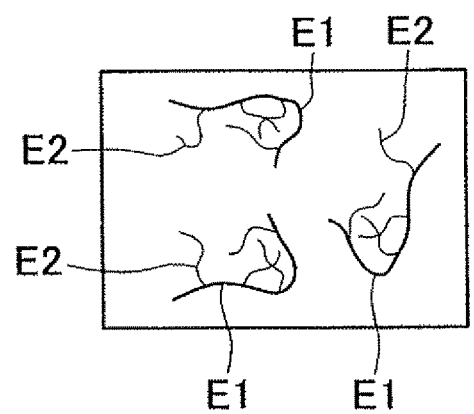

That is, the inventor has assumed that when the water concentration in the electrolyte solution is high, water is adsorbed to the side chain E2 of the electrolyte and the main chain E1 of the electrolyte contracts in the electrolyte solution, as shown in FIG. 3A. Thus, the electrolyte is separated and the viscosity of the electrolyte solution lowers. When the water concentration in the electrolyte solution is somewhat lower, by the action of the organic solvent contained in the electrolyte solution, the main chain E1 of the electrolyte opens in the electrolyte solution, as shown in FIG. 3B. Thus, the main chains E1 are easily entangled with each other and the viscosity of the electrolyte solution is elevated.

Figure 4:
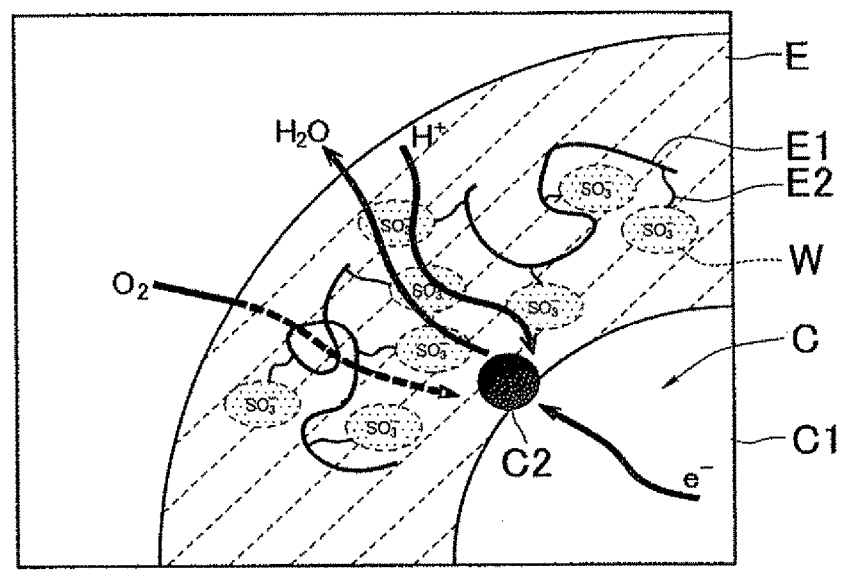
FIG. 4 is a schematic view showing a structure of the reaction layer corresponding to FIG. 3A.

When the reaction layer is formed by mixing an electrolyte solution of an electrolyte in a state shown in FIG. 3A, the reaction layer is considered to be in a state shown in FIG. 4, That is, the main chain of the electrolyte contracts and the main chains are separated from each other, so that when such an electrolyte solution is mixed with a pre-paste, the probability that the hydrophilic region W is formed in a distributed manner becomes high.

In other words, in order to face the hydrophilic side chain E2 of the electrolyte to the catalyst to reliably form a hydrophilic region between the two, the electrolyte in the electrolyte solution is preferably an electrolyte in a state of FIG. 3B. Therefore, as described above, the water content in the electrolyte solution should be 10% by weight or less based on the weight of the electrolyte solution.

The cathode catalyst layer when an electrolyte in a state of FIG. 3B is used is considered to be in a state of FIG. 2.

The side chain E2 of the electrolyte extends in one direction. Therefore, in the catalyst paste, that is, in the reaction layer for the fuel cell, a hydrophilic ion-exchanging group (sulfon group) adsorbs water in the pre-paste. Therefore, in the reaction layer, the hydrophilic group E2 of the electrolyte faces the surface of the catalyst C, as shown in FIG. 2, and the hydrophilic region W is formed between the electrolyte layer E and the catalyst C. It is considered that the sulfon group adsorbs water in the pre-paste as described above, thereby forming hydrophilic regions W that are continuous around the catalyst C and communicated with each other. Therefore, in the reaction layer using this catalyst paste, the proton and water easily move and the electrochemical reaction is smoothly progressed, as shown in FIG. 2. A fuel cell having such a reaction layer can increase the power generating capacity in any state of a low-humidified state and an over-humidified state.

The adjustment of the water content in the electrolyte solution is performed, for example, by evaporating water from the electrolyte solution by heating in a water bath and then, by accordingly adding water to the electrolyte solution.

When water is evaporated from the electrolyte solution, the organic solvent contained in the electrolyte solution is also volatilized. Accordingly, the organic solvent is also added if necessary.

(Mixing of Pre-Paste and Electrolyte Solution)

The pre-paste and the electrolyte solution are mixed to obtain a catalyst paste.

The pre-paste prepared as described above is in the vicinity of the fluidity limit, so that the pre-paste has a high viscosity. The smaller the amount of water contained in the electrolyte solution is, the higher the viscosity of the electrolyte solution is.

When a pre-paste and an electrolyte solution both of which are obtained under a condition for enhancing the viscosity are mixed and stirred, the viscosity of the resultant mixture lowers with time and then, is stabilized at a constant value, as shown in FIG. 5A.

The inventor of the present invention has focused on the behavior of the viscosity of the mixture of the pre-paste and the electrolyte solution when the mixture is stirred.

FIG. 5B shows a relationship between the stirring time (=viscosity) and the reaction layer resistance.

A fuel cell was formed using a catalyst paste obtained by varying the stirring time (=viscosity), and the impedance of the reaction layer of the fuel cell was measured.

From FIGS. 5A and 5B, it is apparent that when the viscosity lowers with stirring, the impedance of the reaction layer becomes higher, as in an inverse proportion thereto.

The increase in impedance means lowering of the movement of the proton in the reaction layer.

As described above, it is apparent that it is preferred that when the catalyst paste is prepared by mixing the pre-paste with the electrolyte solution, the stirring be performed quickly and the homogeneous mixing of the two be completed before the viscosity of the mixture is lowered and stabilized. In other words, when the pre-paste and the electrolyte solution are stirred, the viscosity of the mixture of the two is monitored, and before the viscosity is stabilized at a low value, the stirring is stopped.

When the mixture of the pre-paste and the electrolyte solution is stirred, the periphery of the catalyst of the pre-paste is covered with the electrolyte. At this time, an electrolyte in an open state as in FIG. 3B aligns the hydrophilic group thereof such that the hydrophilic group faces the catalyst, thereby constructing the PFF structure. However, when the stirring is performed even after the PFF structure is constructed (hereinafter, may be called as "over-stirring"), the electrolyte facing the catalyst is separated from the catalyst and at this time, the electrolyte removes water from the catalyst surface and leaves the catalyst surface. Water of the catalyst surface accompanies the electrolyte leaving from the catalyst surface, so that the electrolyte easily takes a form of FIG. 3A. Therefore, it is considered that the viscosity of the electrolyte solution component in the catalyst paste is lowered, which causes the lowering of the viscosity of the catalyst paste itself. In addition, because the electrolyte leaves from the catalyst surface, the PFF structure becomes brittle and the function of the hydrophilic region formed between the catalyst and the electrolyte lowers. This is considered to be a cause of elevating the reaction layer resistance.

Thus, the viscosity of the mixture of the pre-paste and the electrolyte solution is adjusted to a predetermined viscosity. Thus, over-stirring of the two can be prevented. That is, the over-stirred mixture lowers the viscosity thereof as described above, so that by stopping the stirring at the time when the viscosity of the mixture exhibits a predetermined behavior, over-stirring of the mixture can be prevented. By preventing over-stirring, a PFF structure that is constantly stable can be constructed.

For mixing and stirring the pre-paste and the electrolyte solution, a rotation/revolution-type centrifugal stirrer is preferably used. However, a common ball mill, bead mill, stirrer, homogenizer, and the like having mixing and stirring function can also be adopted.

The viscosity of the mixture of the pre-paste and the electrolyte solution varies depending on the materials, the blending ratios, the environment temperature, and the like. Accordingly, the viscosity of the mixture is monitored and the behavior thereof (not the absolute value of the viscosity) is detected and evaluated.

The behavior of the viscosity of the mixture refers to the time change of the viscosity until the viscosity of the mixture is stabilized at a low value. As the behavior of the viscosity, for example, the lowering rate of the viscosity per unit time and the lowering rate of the viscosity relative to the initial viscosity can be adopted.

As is apparent from FIG. 5A, when the stirring of the mixture is performed for over a certain time (4 minutes in an example of FIG. 5A), the lowering rate of the viscosity per hour becomes large. Thus, when the rate of lowering of the viscosity of the mixture due to the stirring exceeds a predetermined value, the stirring can be stopped.

For controlling the viscosity in a production process of the catalyst paste, it is preferred to maintain the rotation speed of a hybrid mixer constant. Furthermore, it is preferred to perform the stirring at a constant temperature.

In order to perform the viscosity control more accurately, the viscosity of the mixture can also be measured in real time during the stirring. For example, using a rotor rotation control-type viscometer, the mixing of the pre-paste and the electrolyte solution and the measurement of the viscosity can also be simultaneously performed. Also applicable is a method in which a bead mill, a homogenizer, or the like is used for mixing the pre-paste and the electrolyte solution, and a viscometer capable of measuring in real time, such as a tuning-fork oscillating type viscometer, is incorporated in the paste circulation line.

In any method, it is preferred to perform the stirring and the viscosity measurement at a constant temperature.

(Formation of Reaction Layer)

The catalyst paste obtained as described above is applied onto a gas diffusion base material to prepare the reaction layer. As the gas diffusion base material, a carbon cloth, a carbon paper, a carbon felt, or the like can be adopted. It is preferred to form a water repelling layer on the surface (face on the reaction layer side) of the gas diffusion base material. The water repelling layer can be formed, for example, from carbon black subjected to a water repelling treatment by PTFE. As the applying method of the catalyst paste, any method such as screen printing, spraying, and inkjet can be adopted.

In the above description, a reaction layer using a catalyst paste having a low viscosity can be provided in a part of an electrode at which flooding is prone to occur, such as in the vicinity of an air outlet, in the vicinity of a hydrogen outlet, in the periphery of the electrode, and in the vicinity of a cooling board. With this, the reaction layer stably exhibits high performance, even in a high humidity atmosphere.

A reaction layer using a catalyst paste having a high viscosity may be provided in a part of an electrode which is prone to dry, e.g., in the vicinity of an air inlet, in the vicinity of a hydrogen inlet, in the central part of the electrode, and in the site distant from a cooling board. With this, the reaction layer exhibits stably high performance, even in a low humidity atmosphere.

By repeating applying of the catalyst paste onto a gas diffusion base material and drying of the resultant coating a predetermined number of times, an air electrode (gas diffusion base material+reaction layer) and a hydrogen electrode (gas diffusion base material+reaction layer) are formed. A solid polymer electrolyte membrane is sandwiched between the air electrode and the hydrogen electrode and they are joined by a hot press or the like to obtain a membrane electrode assembly (MEA). The membrane electrode assembly is sandwiched between the separators to constitute a fuel cell which is a minimum power generating unit.

As described above, principally, the production method of the catalyst paste and a material used for the production have been described.

Figure 6:
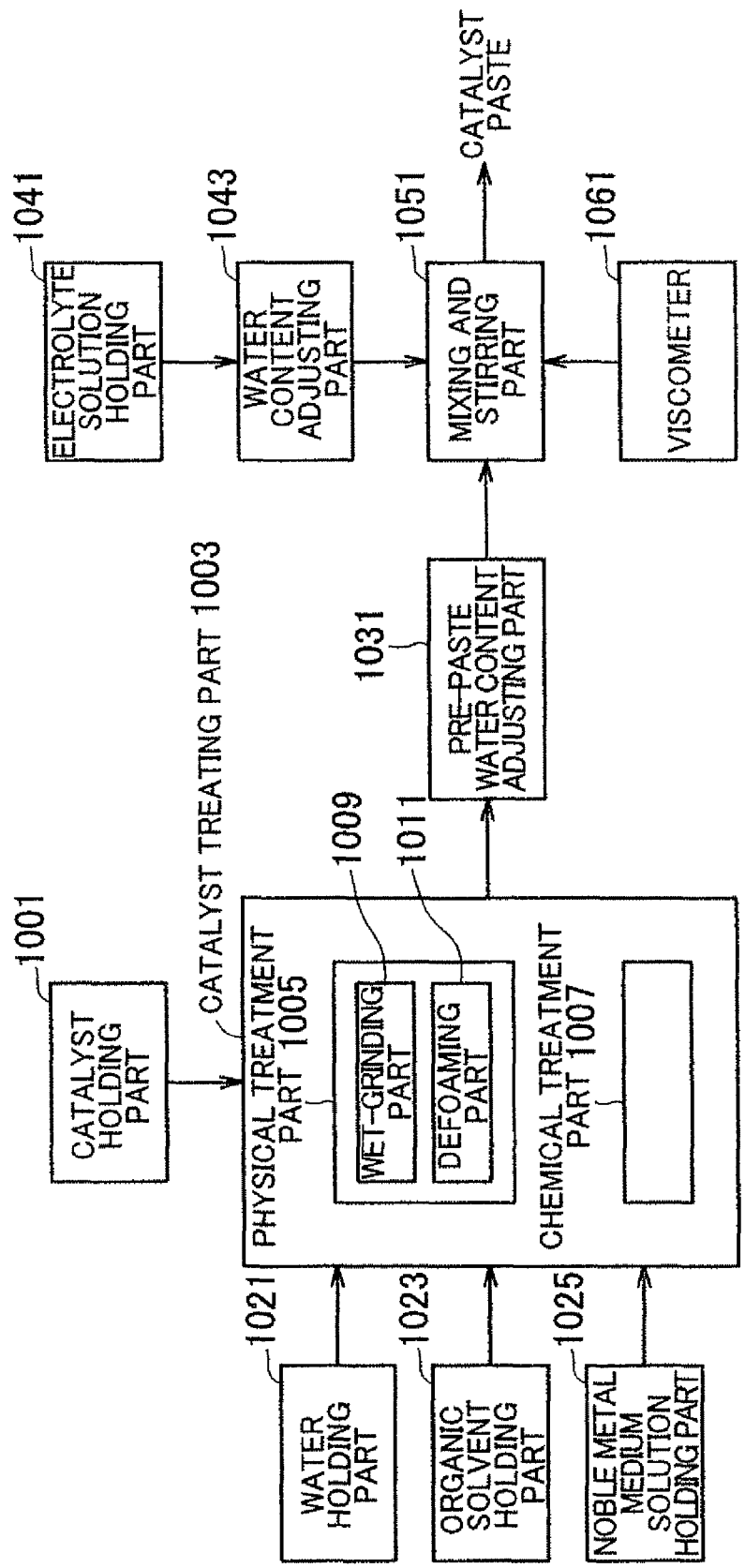
FIG. 6 is a block diagram showing an apparatus for producing a catalyst paste according to the embodiment of the present invention.

FIG. 6 is a block diagram showing an apparatus for producing the catalyst paste.

The catalyst, water, the noble metal complex, and the electrolyte serving as the raw materials for the catalyst paste are prepared in a catalyst holding part 1001, a water holding part 1021, a noble metal complex solution holding part 1025, and an electrolyte solution holding part 1041, respectively. The organic solvent for washing an organic substance from the catalyst is prepared in an organic solvent holding part 1023. Each holding part can utilize a tank formed in the volume and with the material suitable for each holding target.

A catalyst treating part 1003 includes a physical treatment part 1005 and a chemical treatment part 1007. A physical treatment part 1005 includes a wet-grinding part 1009 and a defoaming part 1011. As the wet-grinding part 1009, a homogenizer, a wet jet mill, or the like can be used. As the defoaming part 1011, a hybrid mixer or the like can be used. To the chemical treatment part 1007, a general-purpose stirring apparatus equipped with a stirring propeller can be applied. When a noble metal complex having high reactivity relative to a metal catalyst particle is adopted, it is also possible to inject the noble metal complex solution into a conduit in which the catalyst slurry is flowed to complete the chemical reaction.

In the catalyst treating part, the catalyst is dispersed in a large amount of water to be a slurry pre-paste, so that in a water content adjusting part 1031, the water content of the pre-paste is adjusted.

In this case, the water is removed from the slurry pre-paste, so that a known concentration method (such as a heating and evaporating apparatus, a filtering apparatus, and a centrifugal separating apparatus) can be used. The water content can be determined from the specific gravity of the pre-paste, so that the water content adjusting part is preferably equipped with a specific gravity measuring apparatus. Considering the case where the water content of the pre-paste becomes too small, the water content adjusting part is preferably equipped with a water supplying apparatus.

An electrolyte solution water content adjusting part 1043 is preferably equipped with a heating and evaporating apparatus and a water supplying apparatus. The water content can be determined from the specific gravity of the electrolyte solution, so that the electrolyte solution water content adjusting part is preferably equipped further with a specific gravity measuring apparatus.

A mixing and stirring part 1051 mixes and stirs the pre-paste of which water content is adjusted and the electrolyte solution of which water content is adjusted, and as the mixing and stirring part 1051, a hybrid mixer can be used, for example. However, the mixing and stirring part 1051 is not limited to this. In order to prevent over-stirring, the mixing and stirring part 1051 is preferably equipped with a viscometer 1061.

The present invention relates to the chemical treatment of the catalyst in the above description and as one embodiment thereof, a flow chart for a production method of the PFF structure is shown in FIG. 7.

In step 1, the unmodified catalyst is prepared.

Here, the catalyst refers to a catalyst produced by supporting catalyst metal particles on the carrier. For the carrier, conductivity and air permeability are required, so that a porous carbon particle can be used. Besides the carbon particle, tin oxide, titanium oxide, and the like can also be used.

As the catalyst metal particle, commonly used metal particles such as platinum and a platinum-cobalt alloy can be adopted.

The unmodified catalyst is a catalyst produced by supporting catalyst metal particles on a carrier by a commonly used method. Generally, in order to prevent the interference with the fuel cell reaction, the carrier and the catalyst metal particle of which surfaces are made as pure as possible (that is, in an unmodified state) are provided.

In the present invention, in step 3, the surface of the catalyst metal particle is modified with a specified hydrophilic group.

Here, "modifying" means that the modifying group exists on the surface of the catalyst metal particle, and even through a usual production process, the modifying group is not separated from the catalyst metal particle.

Examples of the hydrophilic group include at least one type selected from a nitric acid group, an amino group, a sulfonic acid group, a hydroxy group, and halogen groups. Further preferred examples of the hydrophilic group include at least one type selected from a nitric acid group, an amino group, and a sulfonic acid group.

By the existence of these hydrophilic groups in the periphery of the catalyst metal particle, a hydrophilic region can be easily formed in the periphery of the catalyst metal particle. The catalyst metal particles are evenly dispersed on the carrier, so that the hydrophilic region on the surface of the catalyst is easily formed and after the formation thereof, the hydrophilic region is stabilized.

As the method for modifying the catalyst metal particle with the hydrophilic group, a complex of the same metal as the catalyst metal particle or a complex of the same type of metal as the catalyst metal particle, which contains the modifying group, is bonded to the catalyst metal particle in the present invention. By utilization of the complex, the catalyst metal particle can be modified with the hydrophilic group without applying any stress to the structure of the catalyst. For example, by charging the unmodified catalyst (produced by supporting catalyst platinum particles on a carbon particle) into a nitric acid aqueous solution of dinitrodiammineplatinum (complex) containing a nitric acid group as a ligand and by stirring the resultant mixture, a platinum complex (dinitrodiammineplatinum) adsorbs to the catalyst platinum particle of the raw material.

As described above, simply and easily, and further, without influencing the structure of the unmodified catalyst (particularly the structure of the carrier), the hydrophilic group which is a ligand of the complex can exist in the periphery of the catalyst metal particle.

By using the solutions below relative to the catalyst platinum particle, the catalyst platinum particle can be modified with the hydrophilic group.

(1) Modifying group: example of nitric acid group dinitrodiammineplatinous (II) nitric acid solution (cis-[Pt(NH$_3$)$_2$(NO$_2$)$_2$]/HNO$_3$ sln.]) aging-treated product thereof (cis-[Pt(NO$_2$)$_4$]/HNO$_3$ sln.) hexahydroxoplatinic (IV) acid nitric acid solution ((H$_2$Pt(OH)$_6$/HNO$_3$ sol.)

(2) Modifying group: example of sulfonic acid group hexahydroxoplatinic (IV) acid sulfuric acid solution ((H$_2$Pt(OH)$_6$/H$_2$SO$_4$ sol.)

(3) Modifying group: example of amino group tetraammineplatinous (II) hydroxide aqueous solution ([Pt(NH$_3$)$_4$(OH)$_2$]/H$_2$O sln.)

Besides, by selecting the complex in the same manner, a hydroxy group or a halogen group can rigidly exist in the periphery of the catalyst platinum particle.

Figures 7A, 7B:
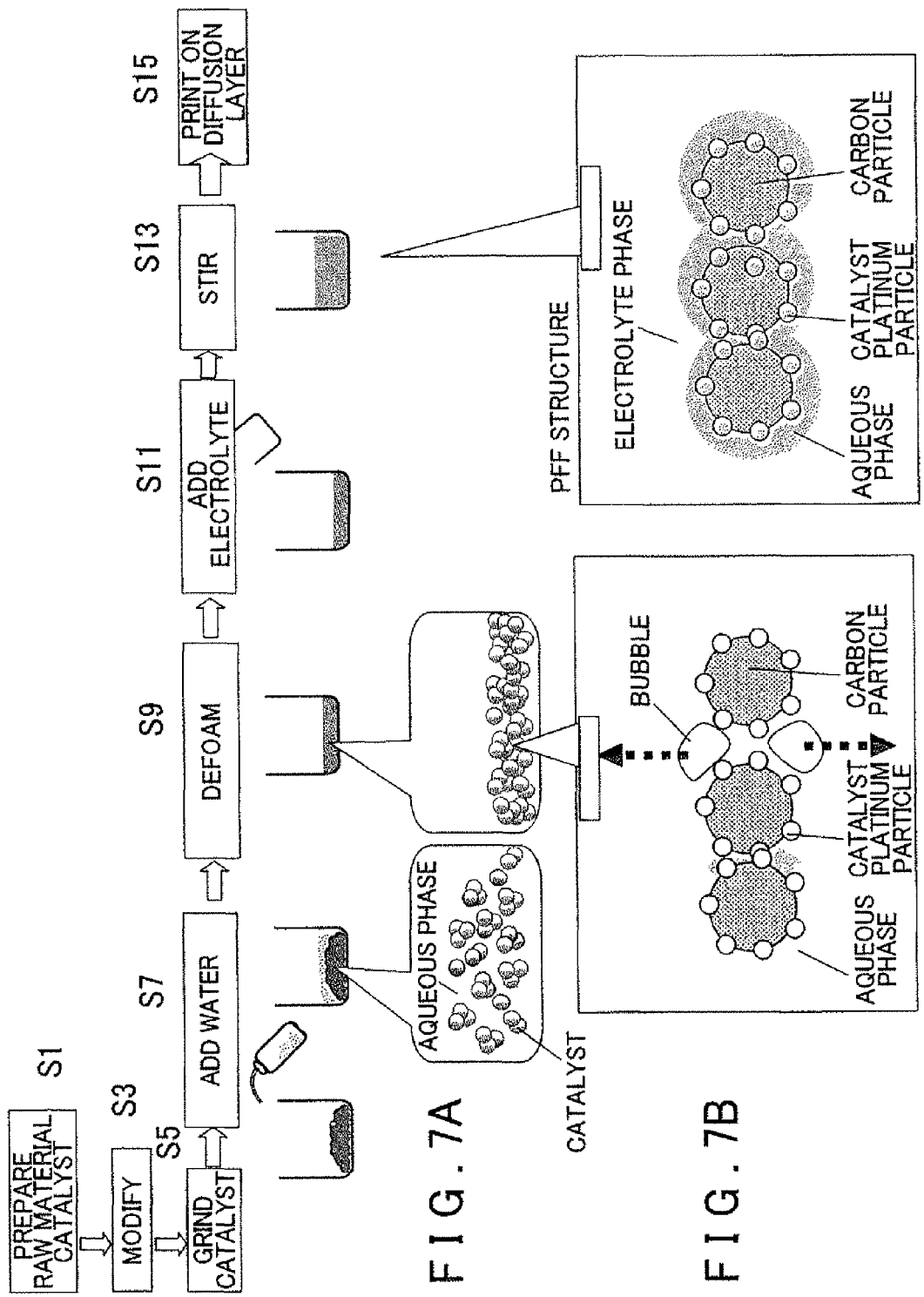
FIG. 7 is a flow chart showing a forming method of a reaction layer having a PFF structure.

Thus, the catalyst metal particle modified with the hydrophilic group is once dried and the catalyst is ground (step 5). Then, the catalyst is dispersed in water (step 7). The dispersing state of the catalyst in this state is schematically shown in FIG. 7A. In the state of FIG. 7A, bubbles exist between the catalysts.

Thus, in step 9, defoaming is performed (see FIG. 7B).

Any method of defoaming can be selected and, for example, a centrifugal stirring method with a hybrid mixer can be used.

Before defoaming, the catalyst is preferably ground again. As the method for grinding the catalyst, there can be mentioned the utilization of an ultrasonic homogenizer.

By grinding again the catalyst immersed in water before defoaming, the degree or the size of the catalyst particle is reduced and the PFF structure is formed using smaller catalyst particles as the core.

Next, the electrolyte solution is added in step 11, and the resultant mixture is stirred in step 13. With this, the PFF structure schematically shown in FIG. 7C is formed. In the PFF structure, the surface of the hydrophilic region (formed in step 9) coating the periphery of the catalyst containing carbon particles supporting catalyst platinum particles, is coated with an electrolyte phase.

As the electrolyte, a commonly used electrolyte as Nafion can be utilized.

A paste obtained in step 13 is applied to a diffusion layer 16 prepared beforehand by a method such as printing. Then, the catalyst is dried and is laminated with the solid electrolyte film 2 to prepare a fuel cell having a constitution shown in FIG. 1.

Next, examples of the present invention are described.

Example 1

As the unmodified catalyst, a catalyst supported on carbon was prepared. This unmodified catalyst is produced by supporting the catalyst platinum particle on a carbon black particle by a known method (supporting amount: 50%).

1 g of an unmodified catalyst was charged into a dinitrodiammineplatinum nitric acid aqueous solution (Pt 0.05 g/150 mL, nitric acid concentration: 0.07% (0.01 M)) and the resultant mixture was stirred with a stirrer at room temperature for 5 hours. Then, the mixture was filtered and was dried in the atmosphere at 60° C. for 2 hours. Furthermore, the mixture was subjected to heating treatment in a nitrogen atmosphere at 150° C. for 2 hours. The final weight of the obtained sample was 1.012 g and the Pt yield obtained from the Pt remaining amount in the filtrate was 84.3%.

Thus, a platinum complex adsorbed to catalyst platinum particles of the unmodified catalyst, so that a nitric acid group was present in the periphery of the catalyst platinum particle.

Next, the obtained catalyst was ground by a blade mill at a rotation speed of 20,000 rpm for 3 minutes.

The ground catalyst was charged together with 100 mL of water into a vessel and was subjected to a defoaming treatment using a hybrid mixer (manufactured by Keyence Corporation, trade name: HM-500). The time for the defoaming treatment was 4 minutes.

After the catalyst was subjected to the defoaming treatment, the catalyst was left over one night and therefrom, the supernatant was discarded, followed by adding 10 g of an electrolyte (5% aqueous solution of Nafion) to the catalyst and stirring (centrifugal stirring using a hybrid mixer for 4 minutes) the resultant mixture.

The thus obtained paste was applied to the diffusion layer to prepare the reaction layer according to the example. The relationship between the voltage and the cell temperature of the fuel cell containing the reaction layer is shown in FIG. 8.

Comparative Example 1 is a reaction layer prepared under the same conditions as those in Example 1, except the modifying step of the nitrogen acid group. Comparative Example 2 is an example in which the catalyst platinum particle supporting amount in the unmodified catalyst was four times that in Example 1 or Comparative Example 1 (the preparing conditions were the same as those in Comparative Example 1).

Figure 8:
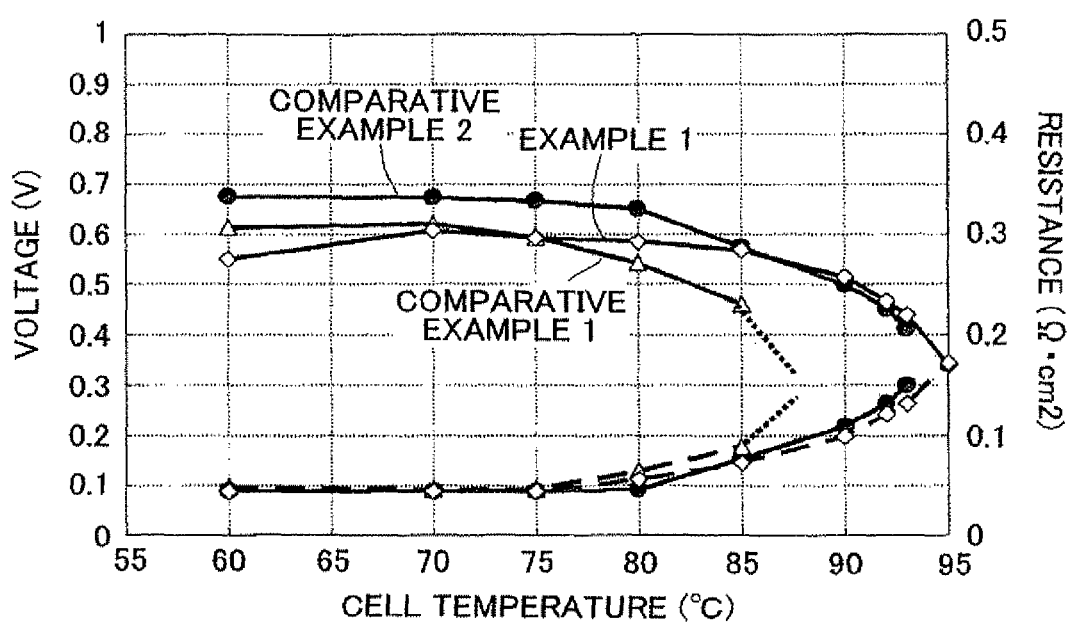
FIG. 8 is a graph showing characteristics of a fuel cell containing a reaction layer according to Example 1.

In FIG. 8, the air supplied to the air electrode side of the fuel cell was fully humidified at 60° C. Thus, when the cell temperature becomes higher than 60° C., the fuel cell falls under a dry condition. Therefore, the results in FIG. 8 show the performance of the fuel cell in a low-humidified environment.

From the results in FIG. 8, it is apparent that in the fuel cell containing the reaction layer obtained by the production method of Example 1, even when the catalyst platinum particle supporting amount is reduced to about ¼, there is not observed lowering of the function of the fuel cell.

From the above descriptions, it is apparent that by modifying the catalyst metal particle with the hydrophilic group, the characteristics of the reaction layer containing the PFF structure can be varied, that is, the characteristics of the reaction layer containing the PFF structure can be controlled.

Example 2

In this example, before the defoaming treatment in the production method of Example 1, the catalyst in water was ground again.

The catalyst in water was ground using an ultrasonic homogenizer. As the ultrasonic homogenizer, an ultrasonic homogenizer (manufactured by Branson Ultrasonics Corporation; trade name: Sonifier Model 1450) was used and a condition for homogenizing was for 10 minutes.

Figure 9:
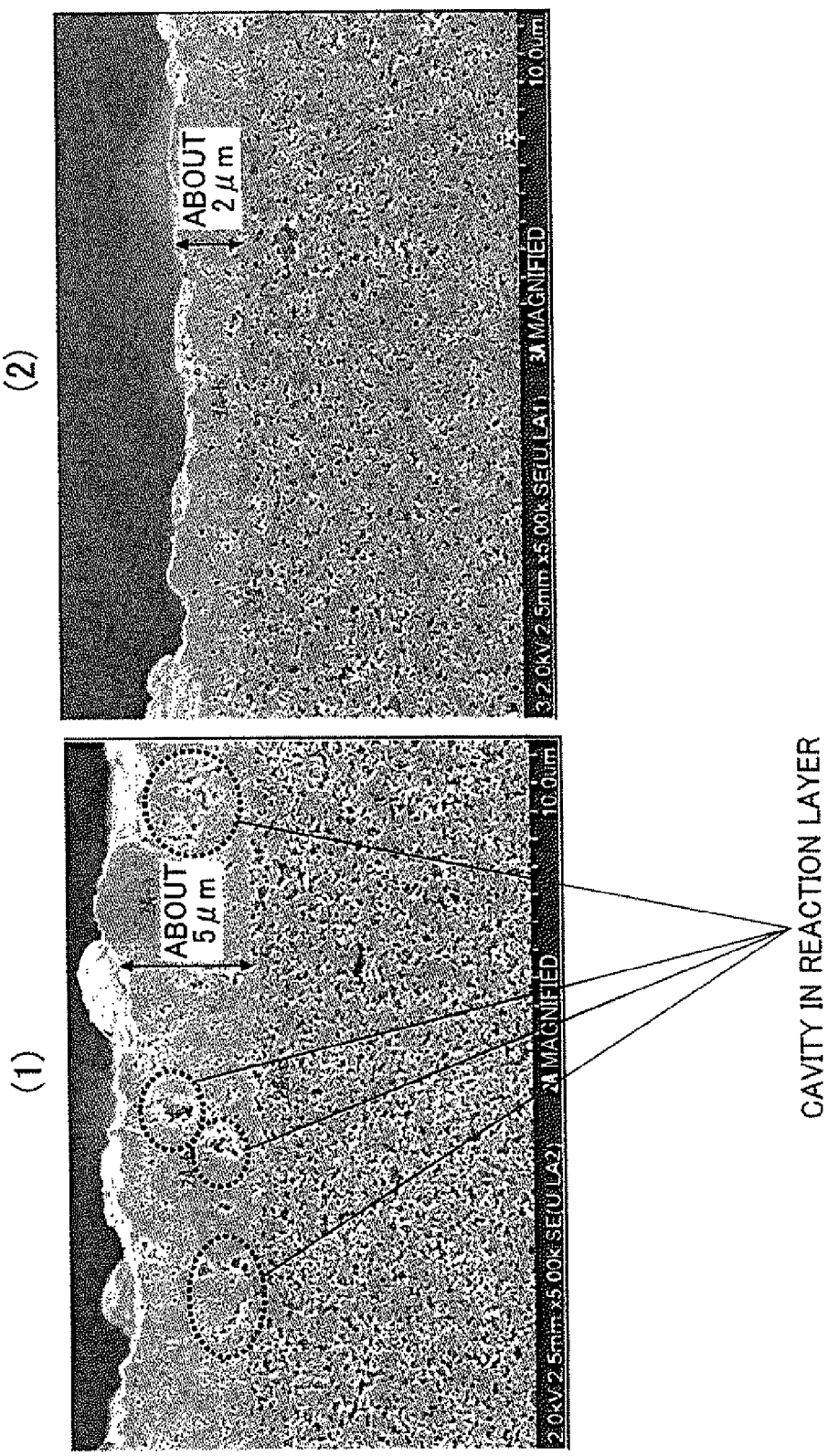
FIG. 9 is a photograph showing a cross section of a reaction layer, where FIG. 9(1) shows a cross section of the reaction layer of Example 1 and FIG. 9(2) shows a cross section of a reaction layer of Example 2.

Section photographs of the reaction layers obtained in Example 1 and Example 2 are shown in FIG. 9(1) and FIG. 9(2), respectively.

As is apparent from FIG. 9, when the catalyst is subjected to the homogenizing treatment before the defoaming treatment, the reaction layer becomes thinner. It is considered that this is because the degree of the catalyst particle is reduced and the catalyst particle becomes smaller due to the homogenizing treatment, and as a result, there is not formed a cavity shown by a dotted line circle in FIG. 9(1).

Figure 10:
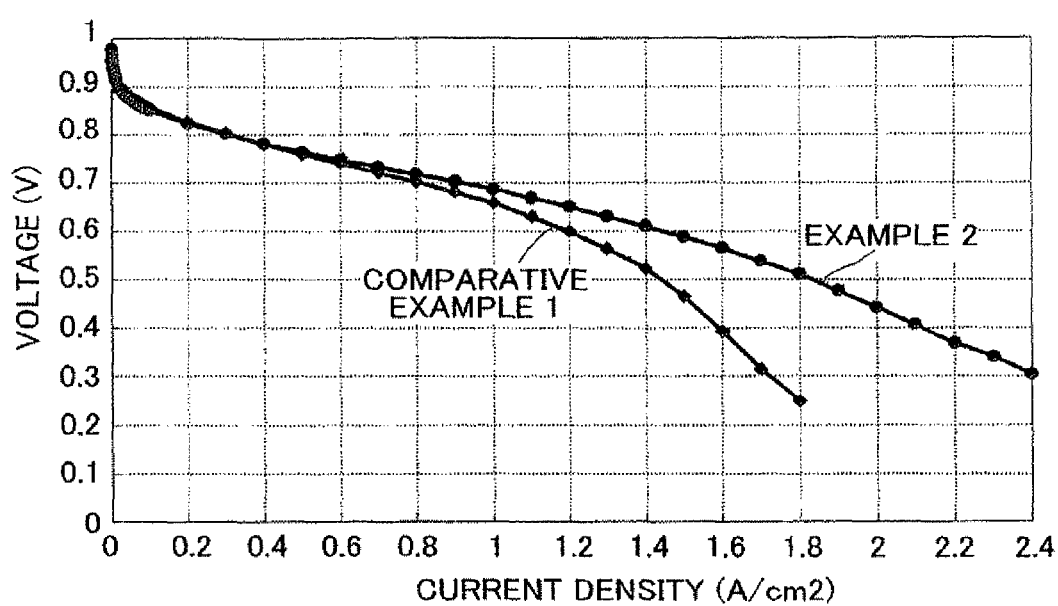
FIG. 10 is a graph showing characteristics of a fuel cell containing the reaction layer of Example 2.

FIG. 10 shows the voltage-current characteristics of Example 2 and Comparative Example 1. The results in FIG. 10 were obtained under a condition that the air supplied to the air electrode was fully humidified at 50° C.

When the reaction layer becomes thinner (assumed that the dispersing amount of the catalyst metal particle is the same), a larger amount of water per unit volume is generated, so that the performance of the fuel cell in a low-humidified environment is enhanced. In a high-humidified environment, the discharge of generated water becomes a problem. In the reaction layer of the present invention, the PFF structure is stable, that is, the hydrophilic region is stable, so that excessively generated water is efficiently moved through this hydrophilic region to the solid polymer film or the diffusion layer. Therefore, even in a high-humidified environment, the characteristics of the fuel cell do not lower.

This indicates also that when the PFF structure is not satisfactory, the discharge of excessively generated water becomes unsatisfactory, so that there a problem of flooding in the reaction layer may occur. Accordingly, it is considered that it is preferred to apply the re-grinding treatment utilizing a homogenizer relative to the catalyst for stabilizing the PFF structure by modifying the catalyst metal particle with the hydrophilic group.

Example 3

As the unmodified catalyst, a platinum catalyst supported on carbon was prepared. This unmodified catalyst was produced by supporting the catalyst platinum particle on a carbon black particle as a carrier by a known method (supporting amount: 50%).

Meanwhile, 1 g of the unmodified catalyst was charged into a hexahydroxoplatinic (IV) acid sulfuric acid aqueous solution (Pt 0.05 g/150 mL, sulfuric acid concentration: 10%) and the resultant mixture was stirred with a stirrer at room temperature for 5 hours. Then, the mixture was filtered and was dried in vacuum at 60° C. for 2 hours. Furthermore, the mixture was subjected to heating treatment in a nitrogen atmosphere at 150° C. for 2 hours.

Figure 11:
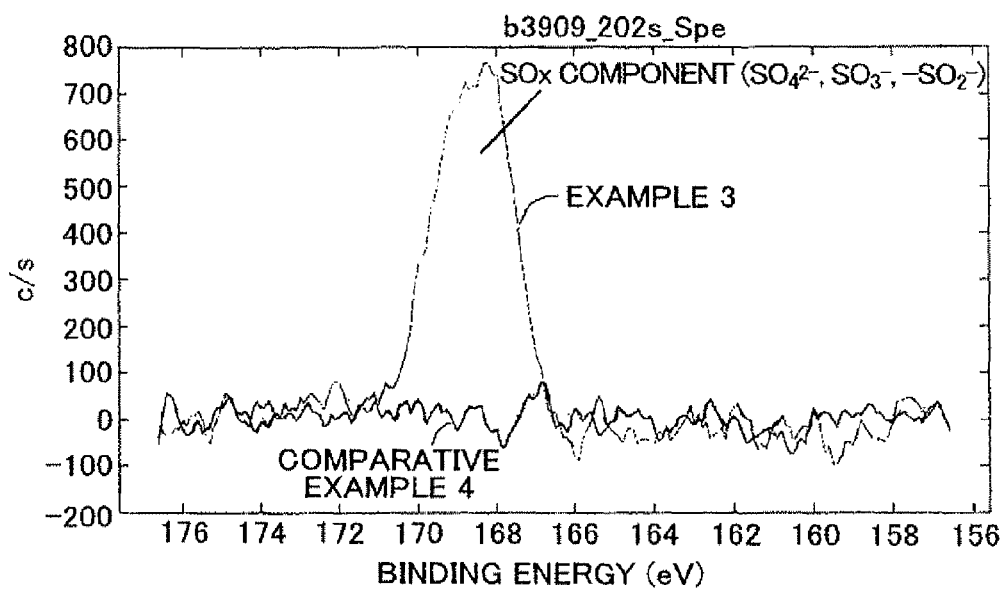
FIG. 11 is an XPS chart of a catalyst of Example 3.

XPS of the obtained sample is shown in FIG. 11.

From the results in FIG. 11, it is apparent that a large amount of sulfonic acid groups is present in the periphery of the catalyst metal particle that was subjected to the above treatment.

The catalyst subjected to the treatment as described becomes the reaction layer constituting the PFF structure in the same manner as in Example 1. The characteristics of such a reaction layer are shown in FIG. 12.

Comparative Example 3 is a reaction layer prepared under the same conditions as those in Example 3, except the modifying step of the sulfonic acid group. Comparative Example 4 is an example in which the catalyst platinum particle supporting amount in the unmodified catalyst was four times that in Example 3 or Comparative Example 3 (the preparing conditions were the same as those in Comparative Example 3).

Figure 12:
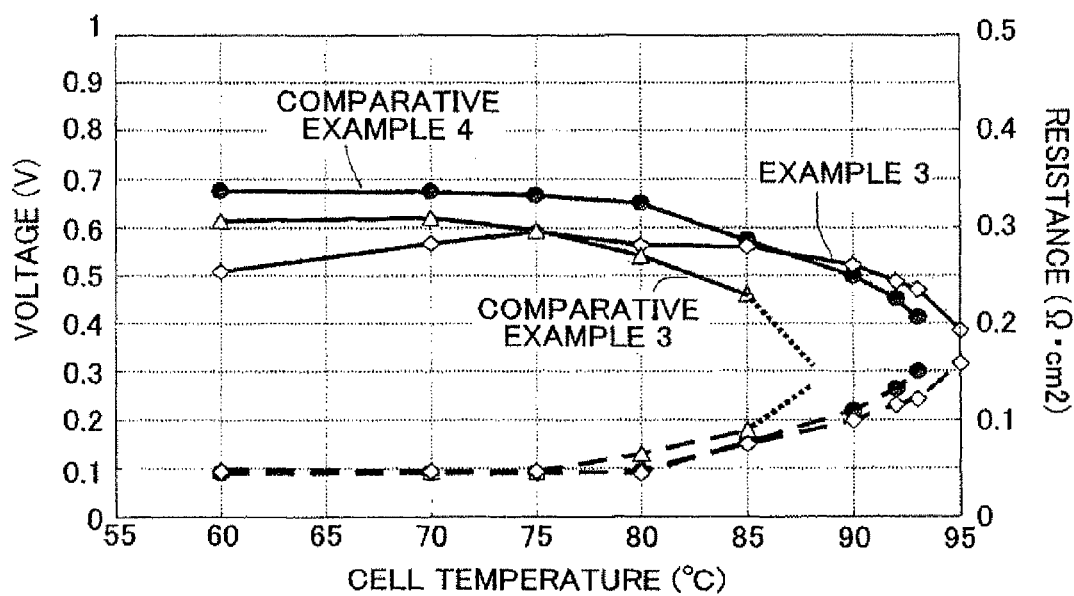
FIG. 12 is a graph showing characteristics of a fuel cell containing a reaction layer of Example 3.

In FIG. 12, the air supplied to the air electrode side of the fuel cell was fully humidified at 60° C. Thus, when the cell temperature becomes higher than 60° C., the fuel cell falls under a dry condition. Therefore, the results in FIG. 12 show the performance of the fuel cell in a low-humidified environment.

From the results in FIG. 12, it is apparent that in the fuel cell containing the reaction layer obtained by the production method of Example 3, even when the catalyst platinum particle supporting amount is reduced to about ¼, there is not observed lowering of the function of the fuel cell.

Example 4

As the unmodified catalyst, a platinum catalyst supported on carbon was prepared. This unmodified catalyst was prepared by supporting the catalyst platinum particle on a carbon black particle as a carrier by a known method (supporting amount: 50%).

Meanwhile, 1 g of the unmodified catalyst was charged into a tetraammineplatinic (IV) hydroxide aqueous solution (Pt 0.05 g/150 mL) and the resultant mixture was stirred with a stirrer at room temperature for 5 hours. Then, the mixture was filtered and was dried in air at 60° C. for 2 hours. Furthermore, the mixture was subjected to heating treatment in a nitrogen atmosphere at 150° C. for 2 hours.

The catalyst subjected to the treatment as described above becomes the reaction layer constituting the PFF structure in the same manner as in Example 1. The characteristics of such a reaction layer are shown in FIG. 13.

Comparative Example 5 is a reaction layer prepared under the same conditions as those in Example 4, except the modifying step of the amino group. Comparative Example 6 is an example in which the catalyst platinum particle supporting amount in the unmodified catalyst was four times that in Example 4 or Comparative Example 5 (the preparing conditions were the same as those in Comparative Example 4).

Figure 13:
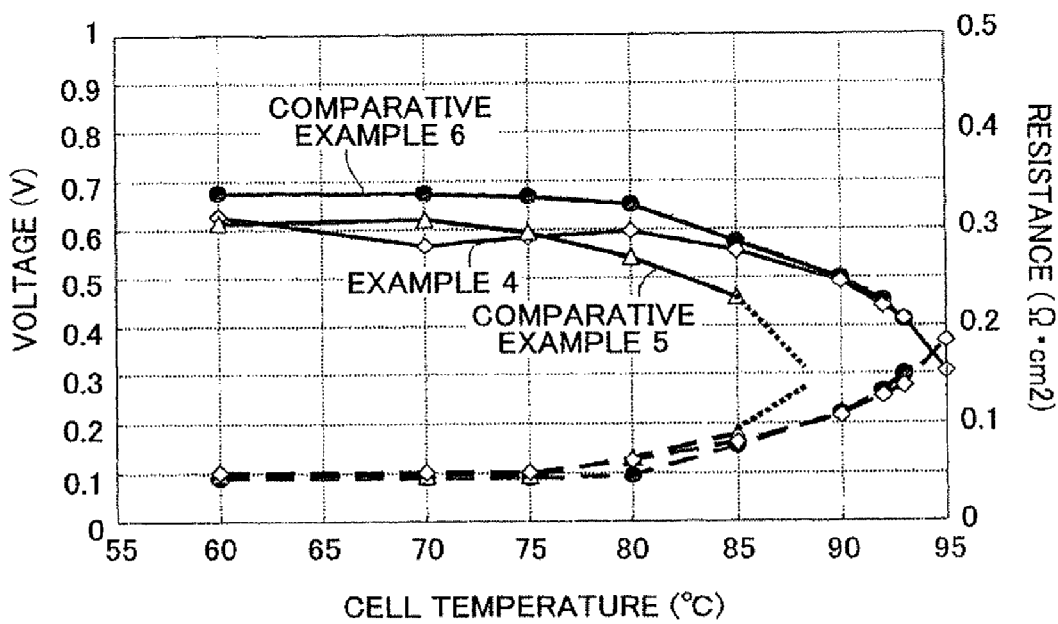
FIG. 13 is a graph showing characteristics of a fuel cell containing a reaction layer of Example 4.

In FIG. 13, the air supplied to the air electrode side of the fuel cell was fully humidified at 60° C. Thus, when the cell temperature becomes higher than 60° C., the fuel cell falls under a dry condition. Therefore, the results in FIG. 13 show the performance of the fuel cell in a low-humidified environment.

From the results in FIG. 13, it is apparent that in the fuel cell containing the reaction layer obtained by the production method of Example 4, even when the catalyst platinum particle supporting amount is reduced to about ¼, there is not observed lowering of the function of the fuel cell, In the examples described above, the chemical treatment relative to the catalyst is performed in a wet system.

The catalyst can be modified with the hydrophilic group also in a dry system.

Figure 14:
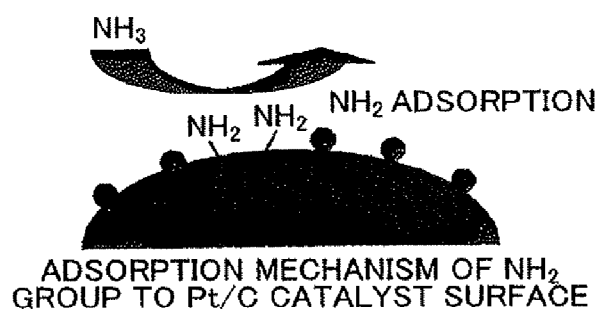
FIG. 14 is a view showing a dry method for modifying a catalyst with a hydrophilic group.

For example, the catalyst in a dry state is left at rest in a reactor and the inside of the reactor is filled with $NH_3$ gas or $NH_3$ gas diluted with an inert gas (such as $N_2$, He, and Ar) to maintain the reaction system at 500° C. or less for around 24 hours. Then, the inside of the reactor is replaced by an inert gas. Thus, an $NH_2$ group can be easily adsorbed to the catalyst surface, so that the catalyst surface can be hydrophilized. In this example, it is considered that the $NH_2$ group is principally bonded to the carrier of the catalyst as shown in FIG. 14.

The present invention is not limited in any way to the embodiments of the invention and the descriptions of the examples. Without departing from the scope of claims and within the range in which a person skilled in the art can easily think of, various modified aspects are also encompassed in the present invention.

DESCRIPTION OF THE REFERENCE NUMERALS

1 Fuel cell
2 Solid electrolyte film
10 Hydrogen electrode
11 Reaction layer
16 Diffusion layer
C Catalyst
C1 Carrier
C2 Catalyst metal particle
E Electrolyte layer
E1 Main chain
E2 Side chain
W Hydrophilic region

The invention claimed is:

1. A method for producing a catalyst paste for a fuel cell, in which a catalyst metal particle including a noble metal is supported on a carrier, the method characterized by comprising the steps of:
   preparing an unmodified catalyst metal particle supported on a carrier;
   modifying the unmodified catalyst metal particle with at least one type of modifying group selected from a nitric acid group, an amino group, a sulfonic acid group, a hydroxy group, and halogen groups to obtain a modified catalyst metal particle having a hydrophilic region formed thereon,
   wherein, in the step of modifying, the unmodified catalyst metal particle supported on the carrier binds a complex of the noble metal, including the modifying group, and changes to said modified catalyst particle, wherein the modifying group exists on the surface of the catalyst metal particle and is not separated from the catalyst metal particle;
   forming a pre-paste by mixing the modified catalyst with water; and
   forming a catalyst paste by mixing the pre-paste with a solution of an electrolyte to form a carrier-supported catalyst having a polymer electrolyte phase surrounding a periphery of the catalyst with the hydrophilic region interposed therebetween.

2. The method for producing a catalyst paste according to claim 1, characterized in that the modifying group is at least one type selected from a nitric acid group, an amino group, and a sulfonic acid group.

3. The method for producing a catalyst paste according to claim 1, characterized in that the catalyst metal particle contains platinum.

4. A method for controlling characteristics of a reaction layer for a fuel cell, including a catalyst in which a catalyst metal particle including a noble metal is supported on a carrier, the method characterized by comprising the steps of:
   preparing an unmodified catalyst metal particle supported on the carrier;
   modifying the unmodified catalyst metal particle with at least one type of modifying group selected from a nitric acid group, an amino group, a sulfonic acid group, a hydroxy group, and halogen groups to obtain a modified catalyst metal particle having a hydrophilic region formed thereon,
   wherein, in the step of modifying, the unmodified catalyst metal particle supported on the carrier binds a complex of the noble metal, including the modifying group and changes to said modified catalyst particle, wherein the modifying group exists on the surface of the catalyst metal particle and is not separated from the catalyst metal particle;
   forming a pre-paste by mixing the modified catalyst with water;
   forming a catalyst paste by mixing the pre-paste with a solution of an electrolyte; and
   applying the catalyst paste to form a carrier-supported catalyst having a polymer electrolyte phase surrounding a periphery of the catalyst with the hydrophilic region interposed therebetween.

5. The method for producing a catalyst according to claim 4, wherein the catalyst metal particle contains platinum.

* * * * *